US012628112B2

(12) United States Patent (10) Patent No.: US 12,628,112 B2

Barbu et al. (45) Date of Patent: May 12, 2026

(54) POSITIONING REQUESTS WITH REFERENCE SIGNALS CONFIGURATION

(71) Applicant: Nokia Technologies Oy, Espoo (FI)

(72) Inventors: Oana-Elena Barbu, Aalborg (DK); Osman Nuri Can Yilmaz, Espoo (FI); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 281 days.

(21) Appl. No.: 18/292,387

(22) PCT Filed: Jul. 30, 2021

(86) PCT No.: PCT/EP2021/071462

§ 371 (c)(1),
(2) Date: Jan. 26, 2024

(87) PCT Pub. No.: WO2023/006222

PCT Pub. Date: Feb. 2, 2023

(65) Prior Publication Data

US 2025/0089001 A1 Mar. 13, 2025

(51) Int. Cl.
H04W 64/00 (2009.01)
H04W 24/10 (2009.01)

(52) U.S. Cl.
CPC ........... H04W 64/00 (2013.01); H04W 24/10 (2013.01)

(58) Field of Classification Search
CPC .............................. H04W 64/00; H04W 24/10
See application file for complete search history.

(56) References Cited

U.S. PATENT DOCUMENTS

| | | | |
|---|---|---|---|
| 2020/0374850 A1 | 11/2020 | Khoryaev et al. | |
| 2021/0144735 A1 | 5/2021 | Manolakos et al. | |
| 2021/0345147 A1* | 11/2021 | Zhang ................. | H04W 64/003 |
| 2022/0053411 A1* | 2/2022 | Bao ........................ | H04W 24/02 |

FOREIGN PATENT DOCUMENTS

| | | |
|---|---|---|
| EP | 3282780 A1 | 2/2018 |
| EP | 3742829 A1 | 11/2020 |
| EP | 3849235 A1 | 7/2021 |

\* cited by examiner

*Primary Examiner* — Nabil H Syed

(74) *Attorney, Agent, or Firm* — McCarter & English LLP

(57) ABSTRACT

Examples of the disclosure relate to an apparatus including: at least one processor; and at least one memory including computer program code, the at least one memory and the computer program code configured to, with the at least one processor, cause the apparatus at least to perform: receiving one or more reference signals; determining one or more metrics from the one or more received reference signals; generating an input for a mapping model based on the one or more metrics; and providing the input to the mapping model to enable the mapping model to create a list of a plurality of configurations for signals that enable positioning that could be undertaken by a network, based on the generated input, wherein the configurations include one or more parameters for signals that enable positioning.

20 Claims, 6 Drawing Sheets

```
┌────────────────────┐
│ Receive reference  │ ~201
│     signals        │
└────────────────────┘
          │
          ▼
┌────────────────────┐
│ Determine metrics  │ ~203
└────────────────────┘
          │
          ▼
┌────────────────────┐
│ Generate input for │ ~205
│  mapping model     │
└────────────────────┘
          │
          ▼
┌────────────────────┐
│  Create list of    │ ~207
│  configurations    │
└────────────────────┘
```

700

710

POSITIONING REQUESTS WITH REFERENCE SIGNALS CONFIGURATION

CROSS REFERENCE TO RELATED APPLICATION

This patent application is a U.S. National Stage application of International Patent Application Number PCT/EP2021/071462 filed Jul. 30, 2021, which is hereby incorporated by reference in its entirety.

TECHNOLOGICAL FIELD

Examples of the disclosure relate to positioning requests. Some examples of the disclosure relate to User Equipment (UE) initiated positioning requests in New Radio (NR) networks.

BACKGROUND

In radio communications networks such as NR networks UEs can initiate positioning requests. Examples of this disclosure provide for management of these requests.

BRIEF SUMMARY

According to various, but not necessarily all, examples of the disclosure there is provided an apparatus comprising:
   at least one processor; and
   at least one memory including computer program code,
   the at least one memory and the computer program code configured to, with the at least one processor, cause the apparatus at least to perform:
   receiving one or more reference signals;
   determining one or more metrics from the one or more received reference signals;
   generating an input for a mapping model based on the one or more metrics; and
   providing the input to the mapping model to enable the mapping model to create a list of a plurality of configurations for signals that enable positioning that could be undertaken by a network, based on the generated input, wherein the configurations comprise one or more parameters for signals that enable positioning.

The configurations for signals that enable positioning may comprise one or more of: a comb size, a bandwidth size, a repetition pattern, a periodicity, a duration of positioning reference signal occasion, a time and frequency offset.

The configurations for signals that enable positioning may comprise Positioning Reference Signal (PRS) configurations.

The one or more metrics may be determined for a plurality of channels between the apparatus and the network.

Historical uses of the plurality of configurations by the network and/or the apparatus may be taken into account by the mapping model when the list of a plurality of configurations for signals that enable positioning is created.

The at least one memory and the at least one computer program may be configured to cause the apparatus to perform; receiving metrics from one or more other apparatus and providing the received metrics as an input to the mapping model.

The at least one memory and the at least one computer program may be configured to cause the apparatus to perform; transmitting metrics to one or more other apparatus and to enable the one or more other apparatus to use the received metrics as an input to a mapping model.

The mapping model may generate an order of preference for the plurality of configurations for signals that enable positioning.

The at least one memory and the at least one computer program may be configured to cause the apparatus to perform; transmitting one or more requests to the network indicating at least some of the plurality of configurations for signals that enable positioning that could be undertaken by a network as identified in the list created by the mapping model.

The requests may comprise a reason for each of the plurality of configurations included in the request.

The mapping model may comprise at least one of; a machine learning model, a decision tree.

The apparatus may obtain information indicative of the plurality of configurations for signals that enable positioning that can be undertaken by the network from at least one of: a node apparatus, a network apparatus.

The apparatus may comprise a UE.

According to various, but not necessarily all, examples of the disclosure there is provided a method comprising:
   receiving one or more reference signals;
   determining one or more metrics from the one or more received reference signals;
   generating an input for a mapping model based on the one or more metrics; and
   providing the input to the mapping model to enable the mapping model to create a list of a plurality of configurations for signals that enable positioning that could be undertaken by a network, based on the generated input wherein the configurations comprise one or more parameters for signals that enable positioning.

The configurations for signals that enable positioning may comprise one or more of: a comb size, a bandwidth size, a repetition pattern, a periodicity, a duration of positioning reference signal occasion, a time and frequency offset.

The configurations for signals that enable positioning may comprise Positioning Reference Signal (PRS) configurations.

According to various, but not necessarily all, examples of the disclosure there is provided a computer program comprising computer program instructions that, when executed by processing circuitry, cause:
   receiving one or more reference signals;
   determining one or more metrics from the one or more received reference signals;
   generating an input for a mapping model based on the one or more metrics; and
   providing the input to the mapping model to enable the mapping model to create a list of a plurality of configurations for signals that enable positioning that could be undertaken by a network, based on the generated input, wherein the configurations comprise one or more parameters for signals that enable positioning.

The configurations for signals that enable positioning may comprise one or more of: a comb size, a bandwidth size, a repetition pattern, a duration of positioning reference signal occasion, a periodicity, a time and frequency offset.

The configurations for signals that enable positioning may comprise Positioning Reference Signal (PRS) configurations.

According to various, but not necessarily all, examples of the disclosure there is provided an apparatus comprising means for:
   receiving one or more reference signals;
   determining one or more metrics from the one or more received reference signals;

generating an input for a mapping model based on the one or more metrics; and providing the input to the mapping model to enable the mapping model to create a list of a plurality of configurations for signals that enable positioning that could be undertaken by a network, based on the generated input, wherein the configurations comprise one or more parameters for signals that enable positioning.

According to various, but not necessarily all, examples of the disclosure there is provided an apparatus comprising:

at least one processor; and at least one memory including computer program code, the at least one memory and the computer program code configured to, with the at least one processor, cause the apparatus at least to perform:

receiving one or more reference signals;

determining one or more metrics from the one or more received reference signals;

generating an input for a mapping model based on the one or more metrics; and providing the input to the mapping model to enable the mapping model to create a list of a plurality of configurations for signals that enable positioning that could be undertaken by a network, based on the generated input, wherein the configurations comprise one or more parameters for signals that enable positioning.

BRIEF DESCRIPTION

Some examples will now be described with reference to the accompanying drawings in which.

DEFINITIONS

CIR Channel Impulse Response
CN Core Network
CNN Convolutional Neural Network
CSI Channel State Information
DL AOD Down Link Angle of Departure
DMRS Demodulation Reference Signal
DNN Deep Neural Network
gNB NR base station
LMF Location Management Function
LPP LTE Positioning Protocol
LSTM Long Short-Term Memory
LTE Long Term Evolution
NAS Non Access Stratum
NR New (5G) Radio
ODPRS On-Demand PRS
OFDM Orthogonal Frequency Division Multiplexing
OTDOA Observed Time Difference of Arrival
PBCH Physical Broadcast Channel
PRS Positioning Reference Signal PSS Primary Synchronization Signal
QoS Quality of Service
RAN Radio Access Network
Res-Net Residual Neural Network
RRC Radio Resource Control
SIM Subscriber Identity Module
SNIR Signal to Noise and Interference Ratio
SNR Signal to Noise Ratio
SRS Sounding Reference Signal
SSB Synchronization Signal Block
SSS Secondary Synchronization Signal
TA Tracking Area
TOA Time of Arrival
UE User Equipment
URLLC Ultra Reliability Low Latency

DETAILED DESCRIPTION

Figure 1:
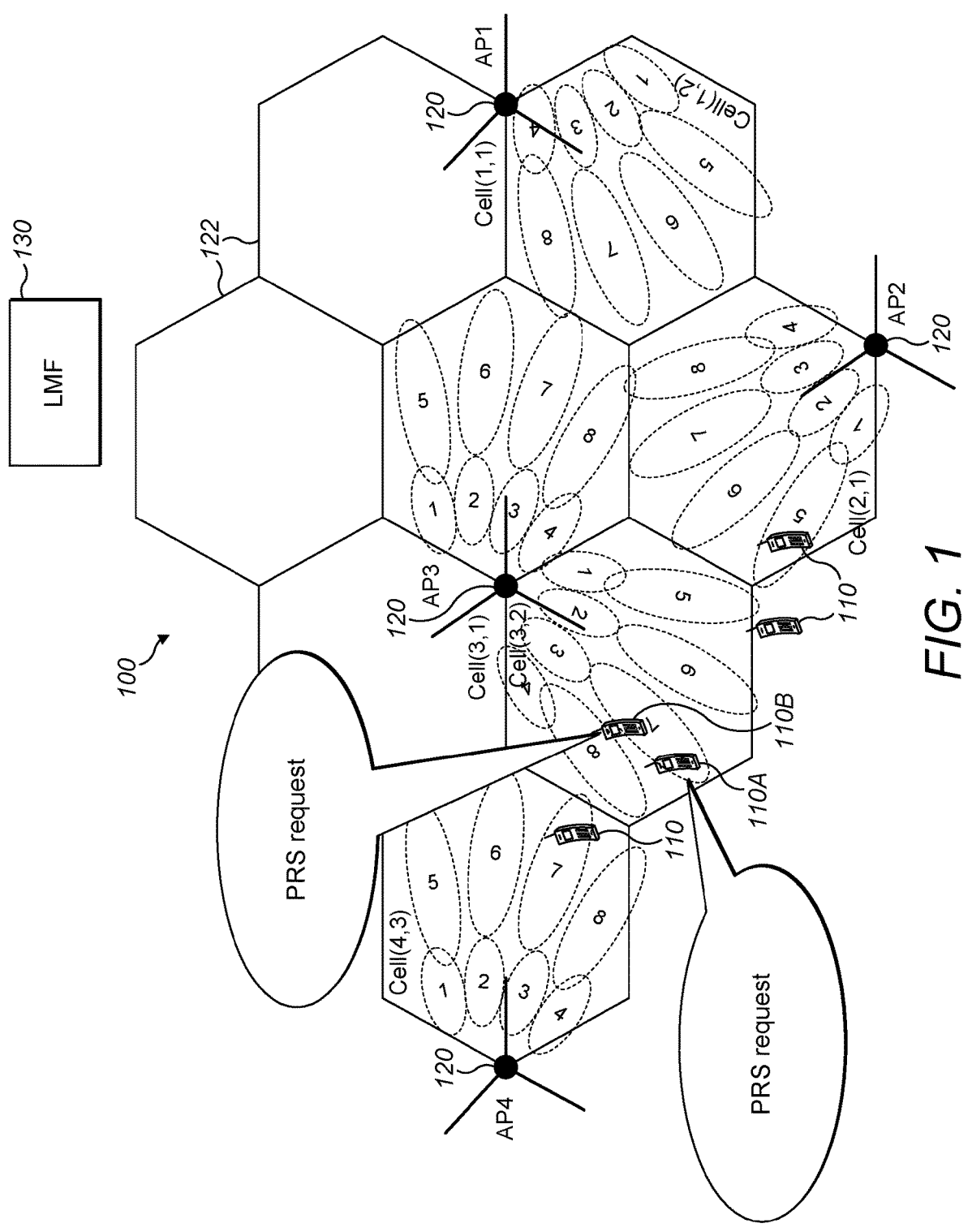
FIG. 1 shows an example of the subject matter described herein.

FIG. 1 illustrates an example of a network 100 comprising a plurality of network entities including terminal apparatus 110, node apparatus 120 and one or more network apparatus 130. The terminal apparatus 110 and node apparatus 120 communicate with each other. The one or more network apparatus 130 communicate with the access nodes 120. In some examples the one or more network apparatus 130 communicate with the terminal apparatus 110.

The one or more network apparatus 130 can, in some examples, communicate with each other. The one or more node apparatus 120 can, in some examples, communicate with each other.

The network 100 can be a cellular network comprising a plurality of cells 122 each served by a node apparatus 120. In this example, the interface between the terminal apparatus 110 and a node apparatus 120 defining a cell 122 is a wireless interface.

The node apparatus 120 comprises a cellular radio transceiver. The terminal apparatus 110 comprises a cellular radio transceiver.

In the example illustrated the cellular network 100 is a third generation Partnership Project (3GPP) network in which the terminal apparatus 110 are user equipment (UE) and the node apparatus 120 can be access nodes such as base stations.

The term 'user equipment' is used to designate mobile equipment comprising a smart card for authentication/encryption etc such as a Subscriber Identity Module (SIM). In other examples the term 'user equipment' is used to designate mobile equipment comprising circuitry embedded as part of the user equipment for authentication/encryption such as software SIM.

The node apparatus 120 can be any suitable base station. A base station is an access node. It can be a network element in Radio Access Network (RAN) responsible for radio transmission and reception in one or more cells to or from the user equipment.

The network 100 can be a 4G or 5G network, for example. It can for example be a New Radio (NR) network that uses gNB or eNB as access nodes 120. New Radio is the 3GPP name for 5G technology.

Such networks 100 can also comprise next generation mobile and communication network, for example, a 6G network.

The node apparatus 120 can be configured to transmit signals such as Positioning Reference Signals (PRS) to UEs within the network 100. The UE 110 can receive and process the PRS, or any other suitable signals, to derive the location of the UE 110. The location of the UE 110 can be derived by the UE (UE-based positioning) or can be derived by one or more network apparatus 130 after the UE 110 has provided measurements to the one or more network apparatus 130 (UE-assisted positioning).

In order to enable On-Demand PRS (ODPRS) stronger reception of PRS signals by the UE 110 may be needed. The stronger reception can enable higher accuracy of the positioning. If this is needed then the network 100 can provide increased PRS resources. The increased PRS resources can comprise increased bandwidth and/or increased number of occasions for PRS. The increased PRS resources can be provided for designated areas or designated subsections of the network 100.

The PRS resources can be transmitted by the node apparatus 120 in different beams. The beams can be directed towards the UEs 110.

In the example shown in FIG. 1 a plurality of UEs 110 are within an area associated with an active positioning session. In this positioning session a plurality of UEs 110 have made a positioning request such as an ODPRS.

The ODPRS request is transmitted from the UE 110 to the network apparatus 130. The network apparatus 130 can be any apparatus configured to determine a location of a UE 110. The network apparatus 130 can be a location management function (LMF) or any other suitable network apparatus 130.

The network apparatus 130 can be configured to request the PRS resources from the node apparatus 120. If the ODPRS request is accepted by the network 100 (that is, the network apparatus 130 and the node apparatus 120), then the UE 110 is able to measure and report the respective PRS. If the ODPRS request is not accepted by the network 100 then the UE needs to instigate another ODPRS request to the network 100.

The network 100 might not be able to satisfy every ODPRS request it receives from the UEs 110. For example, if the resources requested for ODPRS are used for other purposes or if there are resource conflicts with other ongoing positioning sessions in the same cell 122 and/or same area with neighbouring node apparatus 120 overlap, then the network 100 might not be able to satisfy the request. The other purposes that the resources are being used for could be high priority services such as Ultra Reliability Low Latency (URLLC) services, or any other suitable services.

In the example shown in FIG. 1 some of the beams transmitted by the node apparatus 120 are used to convey PRS transmissions while other beams are not used to convey PRS transmissions. In this example a first UE 110A and a second UE 110B are located within the same coverage area. The same beam is directed towards both the first UE 110A and the second UE 110B.

In this example the first UE 110A makes a request for PRS resources while the second UE 110B is currently using those PRS resources. Because there is more than one UE 110 requesting the same PRS resources the request made by the first UE 110A will be refused.

The network 100 could also refuse a request for PRS resource in other circumstances. For instance, the network 100 might not be able to allocate PRS resources to the first UE 110 because the network 100 might have another transmission scheduled for the requested beam or resource.

Therefore, when a UE 110 requests PRS resources it is not guaranteed that the network 100 will accept the request. To take this into account the UE 110 may be configured to instigate additional requests for PRS resources until a PRS resource request is satisfied. This can lead to latency implications. Examples of this disclosure address this issue and provide for a network 100 in which the probability of a UE 110 request for PRS resources will be undertaken is improved. This can reduce the latency issues and provide for an optimized, or substantially optimized, latency.

Figure 2:
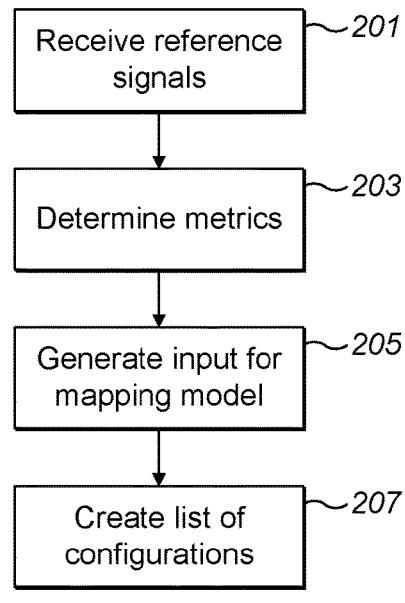
FIG. 2 shows another example of the subject matter described herein.

FIG. 2 shows an example method that can be implemented using examples of the disclosure. This method could be implemented by a terminal apparatus 110 such as a UE 110 or any other suitable type of apparatus.

The method comprises, at block 201, receiving one or more reference signals. The one or more signals can be transmitted by the network 100. For example, the reference signals could be transmitted by a node apparatus 120 and/or a network apparatus 130. The reference signal can comprise any suitable signal or combination of signals that can enable the UE 110 to measure the required metrics.

At block 203 the method comprises determining one or more metrics from the one or more received reference signals. In some examples the metrics can be determined for a plurality of channels between the UE 110 and the network 100. The metrics can be determined for a plurality of channels between the UE 110 and one or more Transmission/Reception Points (TRP). The TRPs can comprise node apparatus 120, network apparatus 130 or any other suitable type of apparatus.

The metrics can be measured from the reference signal. In some examples the metrics can be values that are derived from measurements of the reference signal. For example, there may be some processing of the measurements of the reference signal to obtain one or more of the metrics.

The metrics can comprise any parameters or values that characterize a channel state. For example, the metrics could comprise Signal to Noise Ratio (SNR), Signal to Noise and Interference Ratio (SNIR), Channel Impulse Response (CIR), Time of Arrival (TOA) or any other suitable parameter or value.

At block 205 the method comprises generating an input for a mapping model based on the one or more metrics. The mapping model can comprise any model than enables the metrics to be assigned or correlated with one or more configurations.

The mapping model can comprise a machine learning model, a decision tree and/or any other suitable model or process. In some examples the mapping model can comprise a trained or trainable model.

The generating of the input can comprise converting the metrics into a format that is suitable for use as an input for the mapping model. The format that is used for the input can depend upon the mapping model that is used, the metrics that are available and/or any other suitable factors.

In some examples the input can comprise a vector input. Vector inputs could be used for mapping models comprising neural networks or for any other suitable type of mapping models.

In some examples the UE 110 could receive metrics from one or more other UEs 110. The other UEs 110 could be neighbouring UEs 110. The neighbouring UEs 110 could be located in the same cell 122 or within a geographic area close to the UE 110.

In such examples the UE 110 can use the metrics received from the other UEs 110 to provide one or more inputs to the mapping model. This can enable the UE 110 to obtain information relating to additional channels and use this additional information to help to select the configurations.

Similarly, the UE 110 could also be configured to transmit one or more metrics to the one or more neighbouring UEs 110. This can enable the metrics to be used by the other UEs

110 as inputs for their own mapping models. This can enable the other UEs 110 to generate their own list of configurations.

At block 207 the method comprises providing the input to the mapping model to enable the mapping model to create a list of a plurality of configurations for signals that enable positioning. The configurations can comprise configurations that could be undertaken by the network 100. The mapping model can generate the list of configurations based on the generated input.

The configurations can comprise one or more parameters for signals that enable positioning. The configurations can comprise one or more of: a comb size, a bandwidth size, a repetition pattern, a periodicity, a duration of positioning reference signal occasion, a time and frequency offset or any other suitable parameters.

The configurations for signals that enable positioning can comprise PRS configurations and/or any other suitable configurations.

The mapping model that is used to create the list of configurations can be a machine learning model or any other suitable model. The mapping model can comprise any structure that enables a processor, or other suitable part of a UE 110, to provide an output indicating one or more configurations based on an input comprising metrics that provide information about one or more channels.

Where the mapping model comprises a machine learning model the machine learning model can comprise a neural network or any other suitable type of trainable model. The term "Machine Learning Model" refers to any kind of artificial intelligence (AI), intelligent or other method that is trainable or tuneable using data. The machine learning model can comprise a computer program. The machine learning model can be trained to perform a task, such as creating a list of configurations and/or mapping input metrics to particular configurations, without being explicitly programmed to perform that task. The machine learning model can be configured to learn from experience E with respect to some class of tasks T and performance measure P if its performance at tasks in T, as measured by P, improves with experience E. In these examples the machine learning model can learn from previous channel metrics and configurations that were undertaken for the same or similar channel conditions. The machine learning model can also be a trainable computer program. Other types of machine learning models could be used in other examples.

Any suitable process can be used to train the machine learning model. The training of the machine learning model can be performed using real world/or simulation data. The output of the machine learning model can therefore be based, at least in part, on a past record of ODPRS requests and their probability of being undertaken by the network 100. In some examples the output of the machine learning model can be based, at least in part, on simulation data that simulates the channel conditions in a multi-UE positioning scenario. The simulated scenario can involve a plurality of UEs 110 in an area with simulated channel as well as network traffic conditions, where the UEs 110 are associated with concurrent positioning sessions.

The training data used to train the machine learning model can comprise historical data collected from the network 100 and/or live data collected by the UE 110 and network. The training of the machine learning model can be repeated as appropriate until the machine learning model has attained a sufficient level of stability. The machine learning model has a sufficient level of stability when fluctuations in the predictions provided by the machine learning model are low enough to enable the machine learning model to be used to predict the configurations. The machine learning model has a sufficient level of stability when fluctuations in the predictions provided by the machine learning model are low enough so that the machine learning model provides consistent responses to test inputs.

In some examples the training of the machine learning model can be repeated as appropriate until one or more parameters of the outputs have reached a pre-defined threshold and/or until a predefined accuracy has been attained and/or until any other suitable criteria are satisfied.

In some examples the training of the machine learning model can also comprise considering information available at the UE 110 side on the traffic conditions. These traffic conditions can be defined by the scheduling request and response the UE 110 is sending and receiving by the network 100. This enables the UE 110 to use information on non-positioning related feedback it obtains from the network with respect to the scheduling request for data transmission 100 to assist with the training of the machine learning model and so to assist with the selection of configurations.

It is also possible to train one machine learning model with specific architecture, then derive another machine learning model from that using processes such as compilation, pruning, quantization or distillation. The term "Machine Learning Model" covers also all these use cases and the outputs of them. The machine learning model can be executed using any suitable apparatus, for example CPU, GPU, ASIC, FPGA, compute-in-memory, analog, or digital, or optical apparatus. It is also possible to execute the machine learning model in apparatus that combine features from any number of these, for instance digital-optical or analog-digital hybrids. In some examples the weights and required computations in these systems can be programmed to correspond to the machine learning model.

In some examples the mapping model that is used by the UE 110 could be a device-specific model. For instance, the mapping model could be embedded and preinstalled in the radio chipset of the device and can be updated with firmware or software updates. In other examples the mapping model could be fetched from the network 100. For example, the mapping model could be fetched from a network entity located in an RAN element/function such as a node apparatus 120 or in a core network (CN) element/function such as an LMF.

In some examples at least one parameter and/or step used to train the mapping model can be partly or fully obtained from the network 100. In such examples the mapping model can be left to the device implementation.

In some examples the mapping model and/or one or more model related parameters and/or steps can be downloaded to the UE 110. The mapping model and/or one or more model related parameters and/or steps can be downloaded from a third party provider.

The type of output that is provided by the mapping model can be determined by the structure of the mapping model, the structure of the input to the mapping model and any other suitable factors. In some examples the mapping model can provide a series of probability vectors as an output. The probability vectors can provide an indication of the probability that a configuration corresponding to the vector will be undertaken by the network 100. This can be used to generate a list of configurations that could be undertaken by the network 100.

In some examples, in addition to creating the list of configurations the mapping model could also generate an order of preference for the plurality of configurations. For example, the mapping model can assign a probability to each configuration that indicates how likely it is that the network 100 would undertake that configuration. These probabilities could then be used to rank the configurations into an order preference. The configurations with the higher probabilities of being undertaken could be given a higher order of preference than the configurations with the lower probabilities of being undertaken.

In some examples the mapping model could also receive an input indicating historical uses of one or more of the configurations. These historical uses could be related to the UE 110 and/or one or more neighbouring UEs 110. The historical uses could be indications of occasions that one or more of the configurations have been undertaken by the network 100 and/or indications of occasions that one or more of the configurations have not been undertaken by the network 100.

The UE 110 can be configured so that, once the list of configurations has been obtained the UE 110 can transmit one or more requests to the network 100 indicating at least some of the plurality of configurations identified in the list created by the mapping model. For example, the UE 110 could transmit one or more PRS requests comprising one or more of the configurations that have been identified by the mapping model.

Therefore, in the examples of the disclosure the latency issues are addressed by enabling the UE 110 to generate requests with configurations that have an improved probability of being accepted. The use of the mapping model and the metrics obtained for inputs to the mapping model enable different channel and network conditions to be taken into account when determining which configurations have the highest probability of being accepted.

Figure 3:
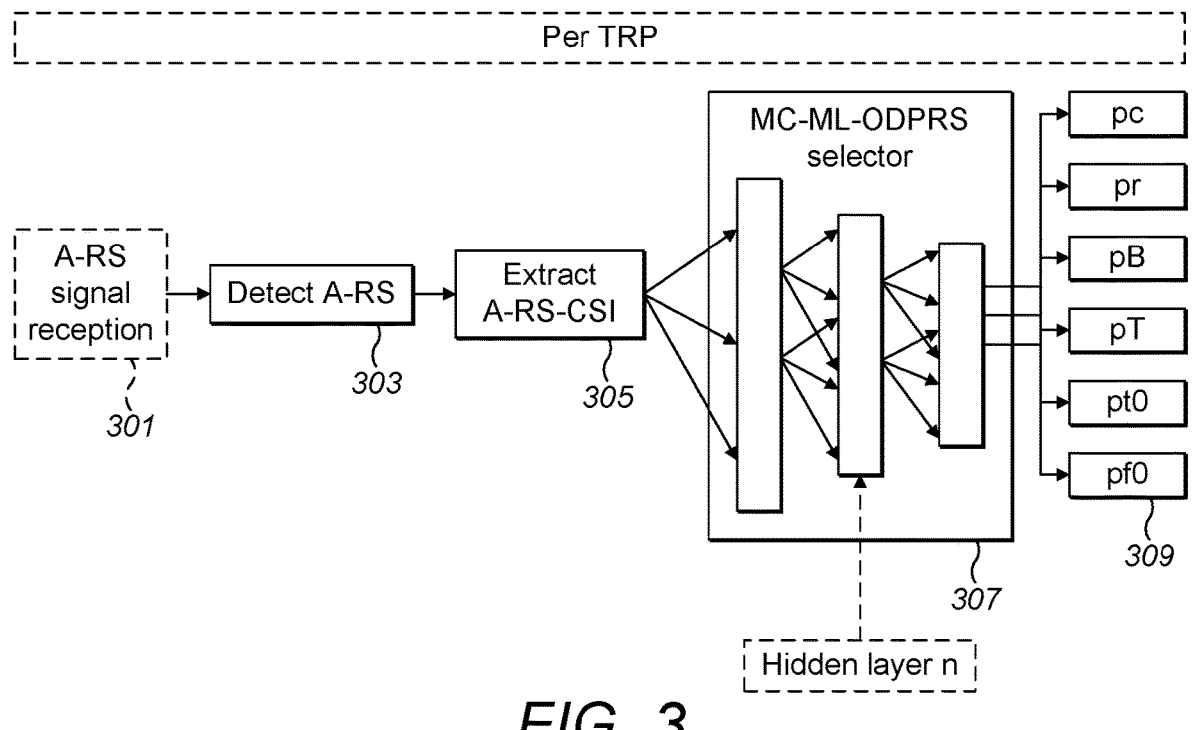
FIG. 3 shows another example of the subject matter described herein.

FIG. 3 schematically shows an example implementation of the disclosure. This shows a method that can be used by a terminal apparatus 110 such as UE for ODPRS selection, or for selecting any other suitable configurations.

In this example the ODPRS selection comprises selecting an ODPRS configuration for a target TRP. The TRP could be a node apparatus 120 or any other suitable part of a network 100.

The ODPRS configuration can comprise any suitable parameters. The ODPRS configuration can comprise one or more of:

comb size, c, (frequency density)
  bandwidth size, B
  repetition pattern, r, (this can be the number of consecutive Orthogonal frequency Demultiplexing (OFDM) symbols carrying ODPRS)
  periodicity T (this can be the number of subframes after which the TRP repeats the ODPRS transmission)
  time and frequency offset, t0, f0, expressed in number of symbols and respectively number of subcarriers.

The configuration can comprise any subset or combination of these parameters. In some examples the configurations could comprise other parameters and/or combinations of parameters.

To select a suitable configuration (c, B, r, T, t0, f0) (i) for a TRP (i) the UE 110 obtains information about the channel conditions between the UE 110 and the TRP. In this case a suitable configuration is a set or subset of the parameters c, B, r, T, t0, f0 that can be used to enable the UE 110 to acquire accurate positioning measurements for the respective TRP. The positioning measurements could comprise Down Link Angle of Departure (DL AOD), Observed Time Difference of Arrival (OTDOA) or any other suitable positioning measurement.

The channel conditions that the UE 110 obtains information about can comprise any information or set of information that characterizes a state of the channel between the UE 110 and the TRP. The information can comprise Signal to Noise Ratio (SNR), Signal to Noise and Interference Ratio (SNIR), Channel Impulse Response (CIR), Time of Arrival (TOA) or any other suitable parameter or value. This information could comprise one or more metrics that can be used to generate an input for a mapping model.

In some examples the UE 110 might select a configuration comprising a subset of the available parameters. For instance the UE 110 could select only the parameters (c, r, T) for each TRP. This could be used where the network 100 has predetermined or fixed the other parameters. In such cases a network entity 130 such as an LMF can instruct the UE 110 to only select a subset of the parameters. The LMF can comprise a network apparatus configured to determine locations of one or more UE 110.

In the example of FIG. 3, at block 301, the UE 110 receives a reference signal A-RS. The reception of the reference signal A-RS could be instructed by a network entity 130 such as an LMF. The signal signature and allocation can be selected by the LMF and can be signalled to the UE 110 via the proactive assistance data or by any other suitable means. The signal signature and allocation are signalled to the UE 110 before the UE 110 makes an ODPRS request.

The reference signal could comprise

Synchronization Signal Block (SSB(s)) for each TRP (the SSBs can comprise, Primary Synchronization Signal (PSS), Secondary Synchronization Signal (SSS), Physical Broadcast Channel (PBCH), Demodulation Reference Signal (DMRS) for PBCH, or any combination of these)
  Channel State Information-Reference Signal for each TRP (i) (CSI-RS (i))
  any other periodic reference signal sent by TRP (i)
  any other RS of TRP (i) that can be triggered by the network 100.

Where the reference signals A-RS comprises an RS of TRP (i) that can be triggered by the network 100 the LMF, or other suitable network entity 130, can control the TRP to trigger the TRP to send a beacon-RS or beacon-like RS to enable the UE 110 to make an ODPRS selection. The beacon-RS or beacon-like RS can be positioning specific. The signature of the beacon-RS or beacon-like RS can be perfectly known by the UE 110.

At block 303 the UE 110 detects the A-RS. The type of detection that is used can depend upon the type of signal that is used. The detection could comprise OFDM demodulation, time-domain cross-correlation operations (that is between the RX signal and a copy of the TX one) or any other suitable process.

At block 305 the UE 110 extracts Channel State Information (CSI) from the A-RS. The UE 100 can be instructed to extract the CSI from the A-RS by the LMF or any other suitable network entity 130.

The A-RS can comprise a plurality of samples y(i)=[y(1, i), . . . , y (N,i)]. The UE 110 can use the samples y(i) to determine one or more metrics that characterize the CSI for the TRP. In some examples the UE 110 can store and use the entire set of samples y(i).

In other examples the UE 110 could process the samples y(i) or a subset of the samples y(i) to extract CSI. The extracted CSI could comprise channel frequency response (CFR): CFR(i)
  channel impulse response (CIR): CIR(i)

signal to noise (and interference) ratio (S(I)NR): S(I)NR (i)

delay and or phase of the most relevant X>=1 multipath components, where X is selected by the UE 110

The CSI that is used can be any one or more of the above listed examples and can be referred to as A-RS-CSI(i).

As examples:

a) A-RS-CSI=y, b) A-RS-CSI=[CIR, SINR], or c) A-RS-CSI=[CFR, SINR],

Other types of CSI and/or combinations of CSI could be used in other examples of the disclosure.

The A-RS-CSI can be used to provide an input to the mapping model. In some examples the A-RS-CSI can be used as the input without any additional processing. In other examples the A-RS-CSI can be processed into a format suitable for use as an input for the mapping model. For example, the A-RS-CSI can be converted into a vector format or other suitable format that can be processed by the mapping model.

At block 307 the mapping model uses the A-RS-CSI to select an ODPRS configuration C(i). In this example the mapping model comprises a machine learning model or supervised machine learning model. Other types of machine learning model could be used in other examples of the disclosure. The machine learning model can be trained using any suitable process. The machine learning model can be trained using real world and/or simulation data.

In this example the machine learning model comprises a multi-class multi-label classifier. The machine learning model is configured to provide a configuration vector C as an output at block 309. The machine learning model can provide a configuration vector C for each TRP (i).

The values in the configuration vector C can correspond the parameters of the configuration. For example the values in the configuration vector C can correspond to c, B, r, T, t0, f0 to provide $C=(c, B, r, T, t0, f0)$. In some examples the configuration vector could correspond to just a sub set of these parameters. For instance, as mentioned previously, the network 100 could fix one or more of the parameters.

Each entry within the configuration vector C can comprise a value from a discrete set of values. For instance, where $C=(c, B, r, T, t0, f0)$ then:

c \in Comb_set={2, 4, 6, 8, 12, . . . } subcarriers as defined in TS. 38.211.

B \in B_set={52, 64, . . . } r \in Rep_set={2, 4, . . . } symbols

T \in Per_set={160, 320, . . . } subframes

T0 \in t-offset_set={1, 2, 3, . . . } symbols

F0 \in f-offset_set={1, 2, . . . } subcarriers

Figure 6A:
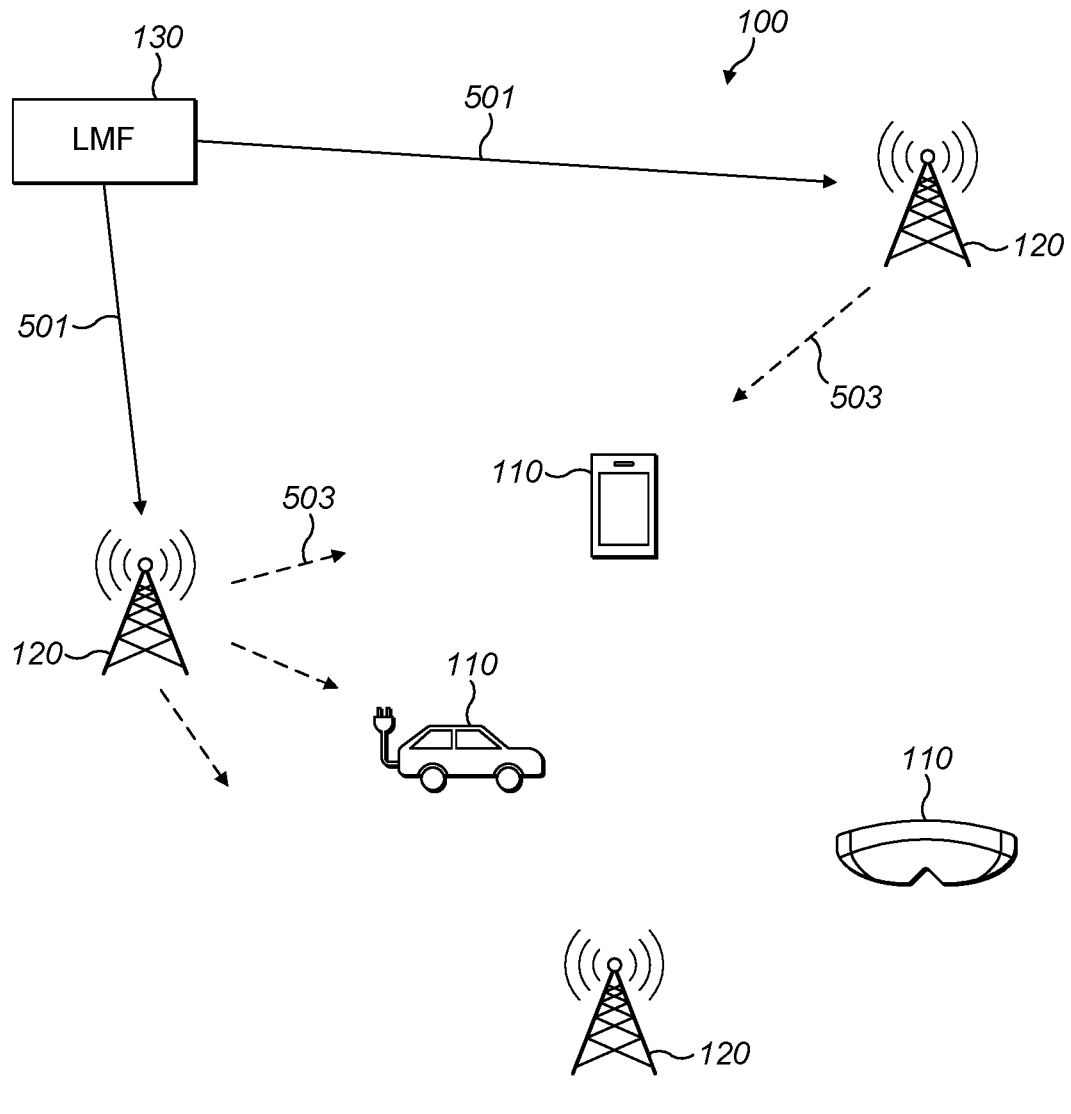
FIGS. 6A and 6B show another example of the subject matter described herein.
Figure 6B:
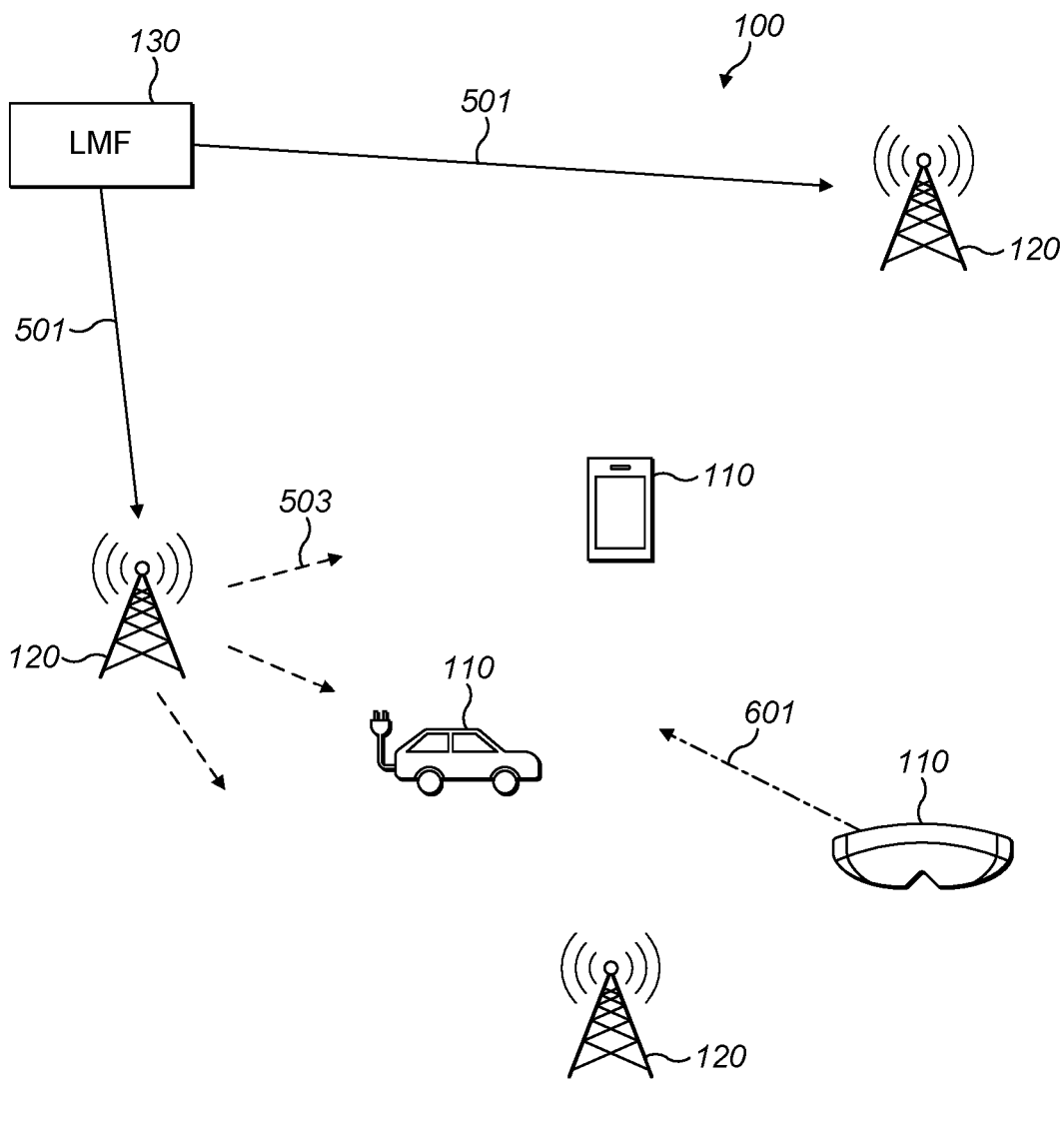

The valid sets Comb_set, . . . , f-offset_set can be signalled by the LMF or other network entity 130. This data could be signalled as shown in FIGS. 6A and 6B.

The machine learning model can be implemented as a Deep Neural Network (DNN), Convolutional Neural Network (CNN), Res-Net Neural Network or any other suitable type of network. The neural network can comprise any suitable number of layers. The neural network can comprise two or more hidden layers. In other examples the machine learning model could be implemented as a decision forest.

The output of the machine learning model can comprise a sigmoid or softmax function.

The machine learning model could be trained using any suitable process such as cross-entropy loss.

The output of the machine learning model can be provided in any suitable format. For example, the output could comprise:

A probability vector for c, in which each entry k expresses the probability that comb size is Com_set (k). In this case, pc=[pc(1), pc(2), . . . ], where pc(1) \in [0, 1] is the probability that the optimal comb size is Comb_set (1).

A probability vector for r, pr.

And similarly, probability vectors for B, T, t0, f0: pB, pT, pt0, pf0.

Figure 4:
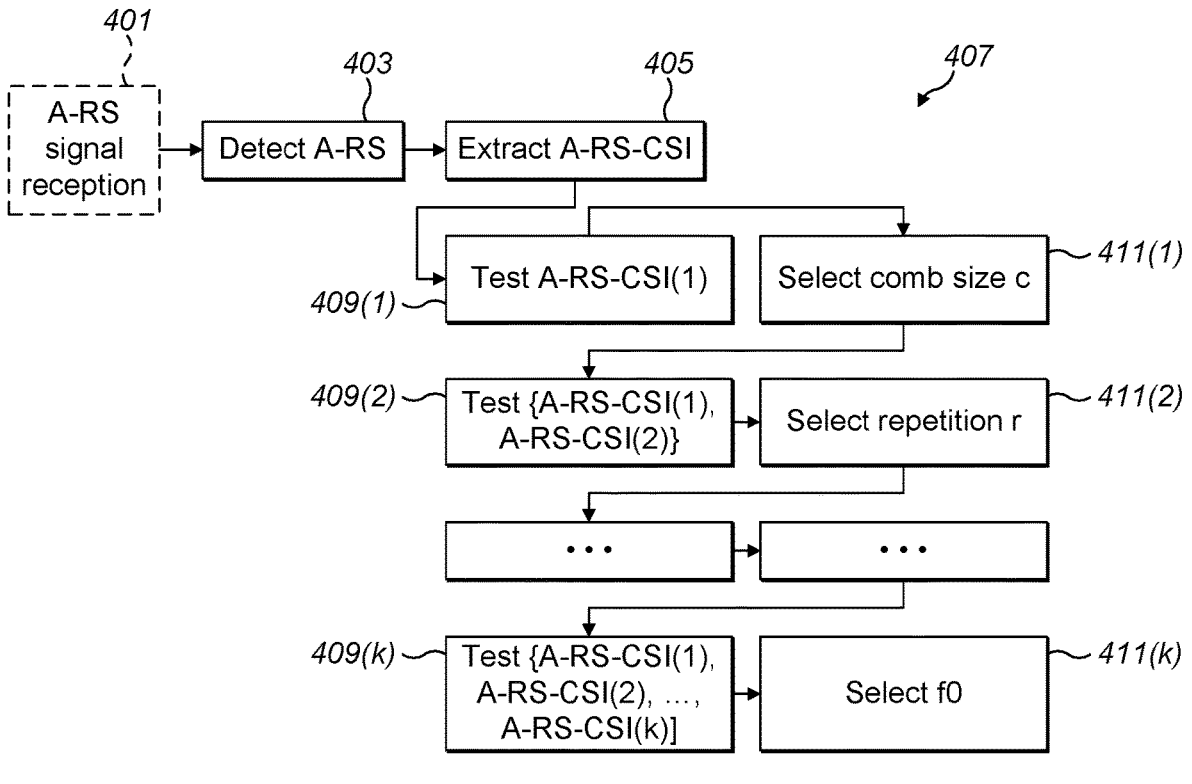
FIG. 4 shows another example of the subject matter described herein.

FIG. 4 schematically shows an example implementation of the disclosure. This shows another method that can be used by a terminal apparatus 110 such as UE for ODPRS selection, or for selecting any other suitable configurations.

At block 401, the UE 110 receives a reference signal A-RS. The reception of the reference signal A-RS could be instructed by a network entity 130 such as an LMF. The signal signature and allocation can selected by the LMF and can be signalled to the UE 110 via the proactive assistance data or by any other suitable means. The signal signature and allocation are signalled to the UE 110 before the UE 110 makes an ODPRS request.

The A-RS can be any suitable type of signal as described previously.

At block 403 the UE 110 detects the A-RS. The type of detection that is used can depend upon the type of signal that is used. The detection could comprise OFDM demodulation, time-domain cross-correlation operations (that is between the RX signal and a copy of the TX one) or any other suitable process.

At block 405 the UE 110 extracts Channel State Information (CSI) from the A-RS. The UE 100 can be instructed to extract the CSI from the A-RS by the LMF or any other suitable network entity 130. The CSI that is extracted can comprise any suitable information such as the CSI described previously.

At block 407 the mapping model uses the A-RS-CSI to select an ODPRS configuration C(i). In this example the mapping model comprises a decision tree.

The decision tree comprises a plurality of test blocks 409 and a plurality of select blocks 411. The test block 409 and select blocks 409 can be implemented as a series of sequential and/or parallel decisions.

The decision tree can comprise any suitable number of test block 409 and select blocks 411. In the example of FIG. 4 the decision tree can comprise at least one test block 409 and at least one select block 411 for each of the parameters (c, B, r, T, t0, f0) of the configurations. Where the UE 110 has been instructed to select a subset of the parameters the decision tree could comprises at least one test block 409 and at least one select block 411 for each of the parameters in the subset.

As an example, sequence comprise block 409(2) and 411(2) which represents Test {A-RS-CSI(1), A-RS-CSI(2) →select repetition r can be implemented as:

```
if A-RS-CSI(1) is in interval(1)
    if A-RS-CSI(2) is in interval (2)
        then
            select r = Rep_set(k), k \in {1, ...,
        Card(Rep_set)}
        else
            select r = Rep_set(j) , j \in {1, ..., Card(Rep_set)}, j
    \neq k.
    elseif A-RS-CSI(2) is in interval (3)
```

-continued

```
    then
          select r = Rep__set(l), l \in {1, ...,
       Card(Rep__set)}
       else
          select r = Rep__set(m) , m \in {1, ...,
    Card(Rep__set)}, j \neq k.
    ...
  elseif if A-RS-CSI(1) is in interval(z)
    if A-RS-CSI(2) is in interval (2)
       then
             select r = Rep__set(a), a \in {1, ...,
          Card(Rep__set)}
       else
          select r = Rep__set(b) , b \in {1, ..., Card(Rep__set)},
    j \neq k.
    elseif A-RS-CSI(2) is in interval (3)
       then
             select r = Rep__set(c), c \in {1, ...,
          Card(Rep__set)}
       else
          select r = Rep__set(d) , d \in {1, ..., Card(Rep__set)},
    j \neq k.
    ...
    Note: \neq = "not equal"
```

The testing intervals referred to in this sequence can be selected using any suitable criteria. In some examples the intervals can be selected based on empirical studies and/or using the RAN4 testing specifications for e.g. PRS/SRS. For example, if A-RS-CSI(x)==SNR, then there are three RAN4 agreed conditions for PRS/SRS test, that is, SNR={−13, −6, 3} dB. These can be used to can define four intervals for A-RS-CSI(x)==SNR, that is: interval (1)=[−13, −6] dB, interval (2)=[−6, −3] dB; interval (3)>−3 dB, interval (4)<−13 dB.

Corresponding sequences can be used for the other blocks.

The output of the decision tree can be a vector indicating one or more configurations and/or any other suitable type of output.

Figure 5:
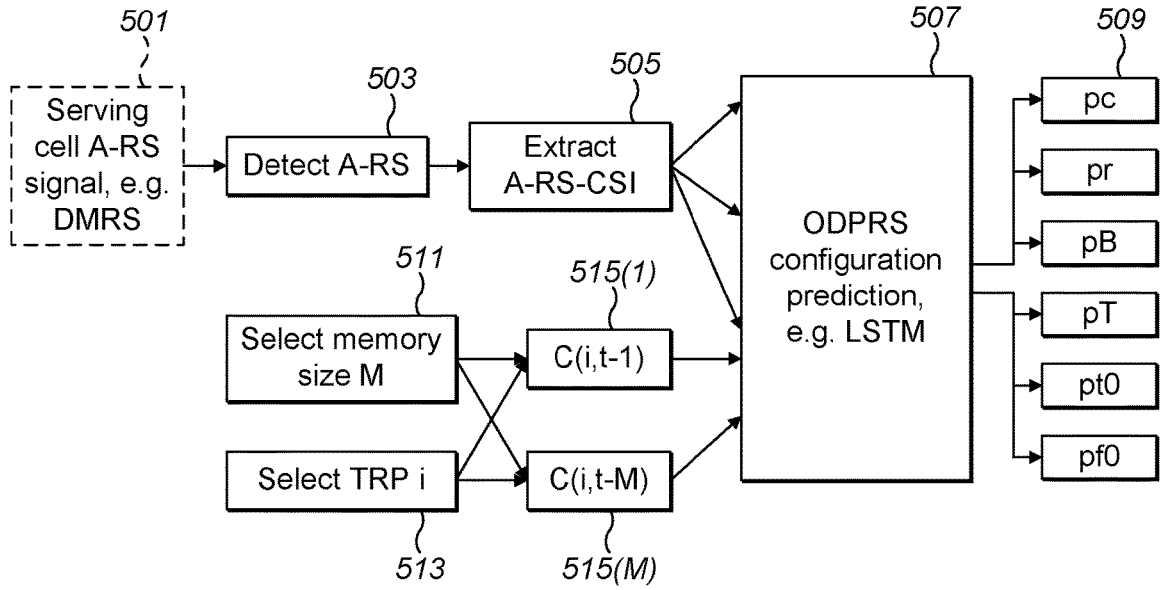
FIG. 5 shows another example of the subject matter described herein.

FIG. 5 schematically shows an example implementation of the disclosure. This shows another method that can be used by a terminal apparatus 110 such as UE for ODPRS selection, or for selecting any other suitable configurations. In this example the UE 110 can use extract CSI from an RS for a serving cell and also use historical positioning information.

At block 501, the UE 110 receives a reference signal A-RS. The reception of the reference signal A-RS could be instructed by a network entity 130 such as an LMF. The signal signature and allocation can be selected by the LMF and can be signalled to the UE 110 via the proactive assistance data or by any other suitable means. The signal signature and allocation are signalled to the UE 110 before the UE 110 makes an ODPRS request.

The A-RS can be a DMRS or any suitable type of signal such as those described previously.

At block 503 the UE 110 detects the A-RS. The type of detection that is used can depend upon the type of signal that is used. The detection could comprise OFDM demodulation, time-domain cross-correlation operations (that is between the RX signal and a copy of the TX one) or any other suitable process.

At block 505 the UE 110 extracts CSI from the A-RS. This can be extracted at time instance t for the serving cell only. The CSI that is extracted can comprise any suitable information such as the CSI described previously. The extracted CSI can be used as an input for the mapping model.

In this example historical information is also used as an input for the mapping model. To obtain the historical information memory size M is selected at block 511. At block 513 a TRP is selected from the available TRPs. At block 515 one or more past configurations are selected for use an input to the mapping model.

In the example of FIG. 5 the number of past configurations used is equal to memory size M. Other numbers of past configurations could be used in other examples of the disclosure.

The inputs that are used for the mapping model can comprise:
Past ODPRS configurations C (i, t−1), . . . , C (i, t−M). The past configurations can be time stamped
A success indicator associated with each configuration C (i, t−x) describing whether the requested ODPRS configuration by the UE was undertaken or not by the network 100 or LMF
A (subset) of the A-RS-CSI (i, t−x)

The historical information that is used as an input for the mapping model can be provided in any suitable format. In some examples the historical information can be provided in a table as shown below:

| Timestamp | TRP ID | Success indicator (1/0) | A-RS-CSI | ODPRS C |
|---|---|---|---|---|
| ts | i | S(I, ts) | A-RS-CSI(I, ts) | C(I, ts) |

At block 507 the mapping model uses the A-RS-CSI and the historical A-RS-CSI (i, t−x) to select an ODPRS configuration C(i). In this example the mapping model comprises a time series analysis model such as a Long Short-Term Memory (LSTM) network or any other suitable type of model.

At block 509 the machine learning model provides a configuration vector C as an output. The mapping model can be used to provide a configuration vector for each of the TRPs.

In the examples of FIGS. 3 to 5 the UEs 100 extracts Channel State Information (CSI) from the A-RS for each of the TRPs. In some examples a target UE 110 can extract the CSI for a subset of the TRPs and then receive the CSI for the remaining TRPs from neighboring UEs 110. The CSI can be received from the neighboring UEs 110 via SL (side link) or any other suitable means. The UE 110 can then apply any suitable methods, such as those shown in FIGS. 3 to 5 to generate the configurations for all TRPS within the set.

In some examples the network 100 can be configured to blacklist one or more of the configurations that could be requested by the UE 110. The network 100 can blacklist the configurations in a unicast or in a broadcast manner. The configurations could be blacklisted for any suitable reason. In some examples the configurations could be blacklisted due to the pre-reservation of the configurations, due to previous requests received by the UE 110, due to previous requests received by other UEs 110 or for any other suitable reason.

In some examples the blacklist can be constructed by the UE 110. For instance, the UE 110 can construct the blacklist in order to avoid biased requests to configuration alternatives which were previously requested by the UE 110 but rejected by the network 100.

In some examples the network 100 can be configured to whitelist one or more of the configurations that could be requested by the UE 110. The network 100 can whitelist the configurations in a unicast or in a broadcast manner. The whitelist dictates the UE 110 to select the closest configuration alternative to the prediction of the mapping model instead of the exact prediction of the mapping model.

In some examples the mapping model could comprise a plurality of different models. The different models can be in-built into the UE 110, partially provided by a network 100 or operator, fully provided by a network 100 or operator, or provided from any other source. The use of the plurality of different models can improve the accuracy of the predictions made by the mapping model.

In other examples the UE 110 can be configured so that it has access to a plurality of different mapping models. The UE 110 can then select one or more of the mapping models to use. The UE 110 can select the one or more of the mapping models to used based on instructions provided by the network 100 or any other suitable factor. In examples where the plurality of available models comprises at least one model provided by the network 100 and at least one model that is inbuilt to the UE 110 the UE 110 can be configured to prioritize models received from the network 100 over the inbuilt models. In some examples the network 100 can restrict the use of one or more models. For example, the network 100 could restrict the use of the in-bult models.

In some examples the validity of the mapping model, or the training of the mapping model, can be configured to depend on the location or connectivity provider. For example a different mapping model and/or different parameters/steps of a mapping model can be used for different areas of the network 100. The different areas of the network 100 could be determined by different node apparatus 120, different tracking areas (TA), different operators or any other suitable factor.

In some examples the validity of the mapping model can de dependent upon time. For instance, the training of the mapping model and/or updates of parameters/steps might need to take place periodically, or the model related parameters/steps might need to be fetched from the operator at certain times or time intervals.

The UE 110 can also be configured to provide the parameters or steps that have been used in a mapping model to a third party. The UE 110 can be configured to provide part of the mapping model and/or part of the parameters or steps. In some examples the UE 110 can be configured to provide all of the mapping model and/of the parameters or steps. The UE 110 can be configured to provide the mapping model and/or part of the parameters or steps to the network 100, to the device manufacturer, to a third-party provider, to the operator or to any other suitable third party. The entity that the UE 110 sends the mapping model and/or part of the parameters or steps can depend on which entity provides the mapping model to the UE 110, privacy constraints, commercial or privacy agreements and/or any other suitable factor. The privacy agreements can be between at least two of the following: network owner, network operator, network vendor, end-user and end-user representative or any other suitable third party.

The UE 110 can be configured to provide the mapping model and/or part of the parameters or steps to the network 100 as a log message/file or in any other suitable message or format. In some examples the message that comprises the mapping model and/or part of the parameters or steps can also comprise additional information such as the predicted/requested configurations and the results of requests.

In some examples before commissioning a mapping model for a practical use, the UE 110 can provide the predictions as a log file. In other examples within a message such as a log message/file, the UE 110 may provide more than a plurality of mapping models and more than one prediction for each prediction instance.

In some examples the interface used for exchanging the information relating to the mapping model, such as the model parameters or the training data, could be through the existing 5G network interfaces. That is, using Uu (between UE 110 and gNB 120) and/or NG-C interface (gNB 120 and CN/LMF). In some examples a new interface over the air and/or in the backhaul, which can fulfil the requirements of such data exchange, can be used. Further, the exact interfaces and protocols to be used over these interfaces could depend on the location/termination point of the related element(s)/function(s), the required or desired transparency to the rest of the network elements/functions, and the communication requirements (such as data amount/bandwidth, availability, reliability, latency and security) and/or any other suitable factor.

FIGS. 6A and 6B show example networks 100 that can be used in examples of the disclosure. In this example the network 100 comprises a network apparatus 130, a plurality of node apparatus 120 and a plurality of UEs 110. In this example the UEs 110 comprise a mobile phone, a vehicle and a headset. Other types of UE 110 could be used in other examples of the disclosure. These networks are configured to enable information relating to configurations such as PRS configurations of the node apparatus 120 to be transmitted to the UEs 110.

In this example the network apparatus 130 is configured to collect information relating to PRS configurations of the node apparatus 120. The network apparatus 130 then transmits a signal 601 indicating the PRS configurations of the plurality of the node apparatus 120. This enables each node apparatus 120 to receive notification of the PRS configurations currently in use and also the PRS configurations used by neighbouring node apparatus 120. The PRS configurations used by neighbouring node apparatus 120 provide alternative PRS configurations.

The node apparatus 120 can then determine a plurality of PRS configurations that are available. That is, from the information indicative of the PRS configurations of the neighbouring node apparatus 120 the node apparatus 120 can determine which configurations it can undertake.

In addition to determining the PRS configurations that can be undertaken the node apparatus 120 can also determine an order of preference for the available PRS configurations. For instance, the highest level of preference could be assigned to the PRS configurations currently in use. The remaining alternative PRS configurations could be ranked in an order based on the amount of network resources they use or any other suitable criteria.

The information indicating the available PRS configurations and their order of preference can be transmitted to the UEs 110 within the network 100 using signal 603. In the example of FIG. 6A the information is broadcast by the node apparatus 120. In other examples the information could be unicast. For example, the network 100 could instigate Non-Access Stratum (NAS) unicast LTE Positioning Protocol (LPP) transferring of the configurations for the area of interest to the UEs 110 within that area.

In some examples when the UE 110 makes the UE-initiated ODPRS request it can also include one or more reasons for requesting alternative PRS configurations. The reasons could be QoS requirements, a need for higher accuracy or any other suitable requirements.

The UEs 110 can receive the information indicating the available PRS configurations and their order of preference. When the UE 110 makes a UE-initiated ODPRS request the UE 110 can select a PRS configuration from the list of available PRS configurations. The UE 110 can use methods as shown in FIGS. 2 to 5, or variations of these methods, to generate the lists of PRS configurations and select configurations.

The UE 110 can make this selection based on the order of preference given. This makes it more likely that the ODPRS request can be undertaken and will reduce latency issues within the positioning request. The latency can be measured by the time between the UE 110 instigating a UE-initiated ODPRS request and the UE 110 receiving an indication to measure the configured PRS.

FIG. 6B shows another example network. In this example the network apparatus 130 is also configured to collect information relating to PRS configurations of the node apparatus 120. The network apparatus 130 then transmits a signal 601 indicating the PRS configurations of the plurality of the node apparatus 120. This enables each node apparatus 120 to receive notification of the PRS configurations currently in use and also the PRS configurations used by neighbouring node apparatus 120. The PRS configurations used by neighbouring node apparatus 120 provide alterna- tive PRS configurations.

The node apparatus 120 can then transmit a signal 603 indicating the PRS configurations of the plurality of the node apparatus 120. This signal 603 can comprise information indicating the PRS configurations currently used by the node apparatus 120 as well as one or more alternative PRS configurations. The alternative PRS configurations can comprise the PRS configurations that are in use at the neigh- bouring node apparatus 120.

The UE 110 receives the information indicating the plu- rality of PRS configurations and can use this information to generate an ODPRS request 601 indicating a plurality of PRS configurations. The UE 110 can use the information received to determine which PRS configurations can be used and determine an order of preference of the PRS configu- rations. The UE 110 can use methods as shown in FIGS. 2 to 5, or variations of these methods, to generate the lists of PRS configurations and select configurations. The ODPRS request 605 can then contain an indication of these PRS configurations and the order for the preference.

In these examples the request can also contain reasons for the order of preference. The reasons could be due to low signal strength, insufficient signal measurement quality, a higher accuracy requirement or any other suitable reason.

In the example of FIG. 6B the request made by the UE 110 does not need to include all of the alternative PRS configu- rations that have been indicated by the node apparatus 120. In some examples the request made by the UE 110 can indicate just a subset of the PRS configurations indicated by the node apparatus 120. The UE 110 can limit the request to include only the PRS configurations that are suitable for the UE 110 and can disregard the other PRS configurations.

In some examples only a single PRS configuration could be determined to be suitable by the UE 110. In such cases the order of preference can comprise a null. This can indicate that there are no suitable alternative PRS configurations. If there are no alternative PRS configurations then a reason for this can also be provided within the request.

The order of preference of the PRS configurations can be indicated by the UE 110 using any suitable notations. In some examples the UE 110 can use a predefined index value to refer to an alternative PRS configurations or a specific order of PRS configurations. This can reduce the message overhead. The predefined index can be defined by the network apparatus 130 or by any other suitable entity. For example, a mapping between the reasons and an index or indicator can be as given in the following table:

| Cause | Indicator |
|---|---|
| high Accuracy | 0 |
| low SNR | 1 |
| very low SNR | 2 |

The reasons for the order of preference of the PRS configurations and the criteria for defining the reasons can be predefined by the network 100, the operator, a specifi- cation or any other suitable entity. For instance, the threshold value for defining a low signal strength can be predefined. In some examples such threshold values can be dependent on the positioning service requirement dictated by a specific use case or application. The cause can be indicated by the UE 110 via a predefined index value.

The use of the alternative configurations and their order of preference and the reasons for the order makes it more likely that the ODPRS request can be undertaken by the network 100. This will reduce latency issues within the ODPRS request.

Figure 7A:
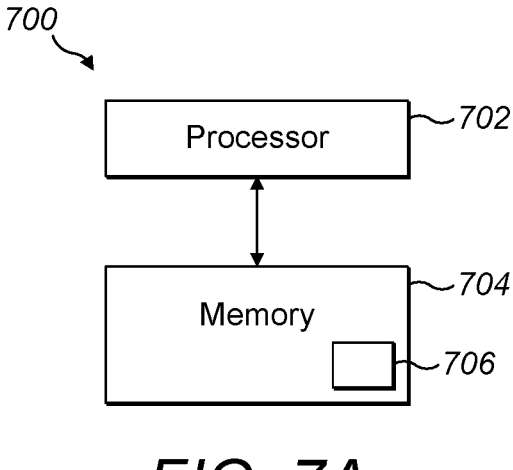
FIGS. 7A and 7B show another example of the subject matter described herein.

FIG. 7A illustrates an example of a controller 700. The controller 700 could be provided within an apparatus such as a UE 110. Implementation of a controller 700 can be as controller circuitry. The controller 700 can be implemented in hardware alone, have certain aspects in software including firmware alone or can be a combination of hardware and software (including firmware).

As illustrated in FIG. 7A the controller 700 can be implemented using instructions that enable hardware func- tionality, for example, by using executable instructions of a computer program 706 in a general-purpose or special- purpose processor 702 that may be stored on a computer readable storage medium (disk, memory etc) to be executed by such a processor 702.

The processor 702 is configured to read from and write to the memory 704. The processor 702 may also comprise an output interface via which data and/or commands are output by the processor 702 and an input interface via which data and/or commands are input to the processor 702.

The memory 704 stores a computer program 706 com- prising computer program instructions (computer program code) that controls the operation of the apparatus when loaded into the processor 702. The computer program instructions, of the computer program 706, provide the logic and routines that enables the apparatus to perform the methods illustrated in FIGS. 2 to 5. The processor 702 by reading the memory 704 is able to load and execute the computer program 706.

In examples where the apparatus is provided within a UE 110 the apparatus therefore comprises: at least one proces- sor; and at least one memory including computer program code; the at least one memory and the computer program code configured to, with the at least one processor, cause the apparatus at least to perform;

receiving one or more reference signals;

determining one or more metrics from the one or more received reference signals;

generating an input for a mapping model based on the one or more metrics; and providing the input to the mapping model to enable the mapping model to create a list of a plurality of con- figurations for signals that enable positioning that could be undertaken by a network, based on the generated input, wherein the configurations comprise one or more parameters for signals that enable positioning.

Figure 7B:
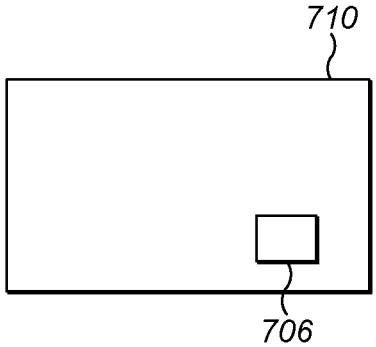

As illustrated in FIG. 7B, the computer program 706 may arrive at the apparatus or network apparatus via any suitable delivery mechanism 710. The delivery mechanism 710 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 706. The delivery mechanism may be a signal configured to reliably transfer the computer program 706. The apparatus may propagate or transmit the computer program 706 as a computer data signal.

Computer program instructions for causing a UE 110 to perform at least the following or for performing at least the following:

receiving one or more reference signals;

determining one or more metrics from the one or more received reference signals;

generating an input for a mapping model based on the one or more metrics; and providing the input to the mapping model to enable the mapping model to create a list of a plurality of configurations for signals that enable positioning that could be undertaken by a network, based on the generated input, wherein the configurations comprise one or more parameters for signals that enable positioning.

The computer program instructions may be comprised in a computer program, a non-transitory computer readable medium, a computer program product, a machine readable medium. In some but not necessarily all examples, the computer program instructions may be distributed over more than one computer program.

Although the memory 704 is illustrated as a single component/circuitry it may be implemented as one or more separate components/circuitry some or all of which may be integrated/removable and/or may provide permanent/semi-permanent/dynamic/cached storage.

Although the processor 702 is illustrated as a single component/circuitry it may be implemented as one or more separate components/circuitry some or all of which may be integrated/removable. The processor 702 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in the FIGS. 2 to 5 can represent steps in a method and/or sections of code in the computer program 706. The illustration of a particular order to the blocks does not necessarily imply that there is a required or preferred order for the blocks and the order and arrangement of the block may be varied. Furthermore, it can be possible for some blocks to be omitted.

Where a structural feature has been described, it may be replaced by means for performing one or more of the functions of the structural feature whether that function or those functions are explicitly or implicitly described.

In some but not necessarily all examples, the UE 110, and the network 100 are configured to communicate data with or without local storage of the data in a memory 704 at the UE 110, or the node apparatus 120 and with or without local processing of the data by circuitry or processors at the UE 110, or the node apparatus 120.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The UE 110 and the network 100 can be part of the Internet of Things forming part of a larger, distributed network.

The processing of the data, whether local or remote, can be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the UE 110, and the node apparatus 120 where it may produce an output sensible to the subject such as an audio output, visual output or haptic output.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
at least one processor; and
at least one non-transitory memory,
storing instructions that, when executed with the at least one processor, cause the apparatus at least to perform:
receiving one or more reference signals;
determining one or more metrics from the one or more received reference signals;
generating an input for a mapping model based on the one or more metrics; and
providing the input to the mapping model to enable the mapping model to create a list of a plurality of configurations for signals that enable positioning that could be undertaken with a network, based on the generated input, wherein the configurations comprise one or more parameters for signals that enable positioning.

2. An apparatus as claimed in claim 1 wherein the configurations for signals that enable positioning comprise one or more of: a comb size, a bandwidth size, a repetition pattern, a periodicity, a duration of positioning reference signal occasion, a time, or frequency offset.

3. An apparatus as claimed in claim 1 wherein the configurations for signals that enable positioning comprise positioning reference signal configurations.

4. An apparatus as claimed in claim 1 wherein the one or more metrics are determined for a plurality of channels between the apparatus and the network.

5. An apparatus as claimed in claim 1 wherein historical uses of the plurality of configurations with at least one of the network or the apparatus are taken into account with the mapping model when the list of a plurality of configurations for signals that enable positioning is created.

6. An apparatus as claimed in claim 1 wherein the instructions, when executed with the at least one processor, cause the apparatus to perform receiving metrics from one or more other apparatus and providing the received metrics as an input to the mapping model.

7. An apparatus as claimed in claim 1 wherein the instructions, when executed with the at least one processor, cause the apparatus to perform transmitting metrics to one or more other apparatus and to enable the one or more other apparatus to use the received metrics as an input to a mapping model.

8. An apparatus as claimed in claim 1 wherein the instructions, when executed with the at least one processor, cause the apparatus to generate an order of preference for the plurality of configurations for signals that enable positioning.

9. An apparatus as claimed in claim 1 wherein the instructions, when executed with the at least one processor, cause the apparatus to perform transmitting one or more requests to the network indicating at least some of the plurality of configurations for signals that enable positioning that could be undertaken with a network as identified in the list created with the mapping model.

10. An apparatus as claimed in claim 9 wherein the one or more requests comprise a reason for the plurality of configurations included in the request.

11. An apparatus as claimed in claim 1 wherein the mapping model comprises at least one of a machine learning model or a decision tree.

12. An apparatus as claimed in claim 1 wherein the instructions, when executed with the at least one processor, cause the apparatus to obtain information indicative of the plurality of configurations for signals that enable positioning that can be undertaken with the network from at least one of: a node apparatus or a network apparatus.

13. An apparatus as claimed in claim 1 wherein the apparatus is a user equipment.

14. A method, comprising:

receiving one or more reference signals;

determining one or more metrics from the one or more received reference signals;

generating an input for a mapping model based on the one or more metrics; and providing the input to the mapping model to enable the mapping model to create a list of a plurality of configurations for signals that enable positioning that could be undertaken with a network, based on the generated input wherein the configurations comprise one or more parameters for signals that enable positioning.

15. A method as claimed in claim 14 wherein the configurations for signals that enable positioning comprise one or more of: a comb size, a bandwidth size, a repetition pattern, a periodicity, a duration of positioning reference signal occasion, a time, or frequency offset.

16. A method as claimed in claim 14 wherein the configurations for signals that enable positioning comprise positioning reference signal configurations.

17. A non-transitory program storage device readable with an apparatus, tangibly embodying a program of instructions executable with the apparatus for performing at least the following:

receiving one or more reference signals;

determining one or more metrics from the one or more received reference signals;

generating an input for a mapping model based on the one or more metrics; and providing the input to the mapping model to enable the mapping model to create a list of a plurality of configurations for signals that enable positioning that could be undertaken with a network, based on the generated input, wherein the configurations comprise one or more parameters for signals that enable positioning.

18. A non-transitory program storage device as claimed in claim 17 wherein the configurations for signals that enable positioning comprise one or more of: a comb size, a bandwidth size, a repetition pattern, a periodicity, a duration of positioning reference signal occasion, a time, or frequency offset.

19. A non-transitory program storage device as claimed in claim 17 wherein the configurations for signals that enable positioning comprise positioning referenced signal configurations.

20. A method as claimed in claim 14 wherein the one or more metrics are determined for a plurality of channels between an apparatus and the network.

* * * * *